US006088152A

United States Patent [19]

Berger et al.

[11] Patent Number: 6,088,152

[45] Date of Patent: Jul. 11, 2000

[54] OPTICAL AMPLIFIER ARRANGED TO OFFSET RAMAN GAIN

[75] Inventors: Matthias Berger; Dirk Bode, both of Tinton Falls; Daniel A. Fishman, Lakewood; Gabriela Livescu, Marlboro; Christian Raabe, Tinton Falls; Fatimah Shehadeh, Ocean; Jianhui Zhou, Freehold; Martin Zirngibl, Middletown, all of N.J.

[73] Assignee: Lucent Technologies Inc., Murray Hill, N.J.

[21] Appl. No.: 09/265,943

[22] Filed: Mar. 8, 1999

[51] Int. Cl.[7] .............................. H01S 3/10; H01S 3/108; H01S 3/30

[52] U.S. Cl. ........................... 359/334; 359/124; 359/174

[58] Field of Search .................................... 359/124, 133, 359/134, 151, 160, 174, 176, 177, 334, 337

[56] References Cited

U.S. PATENT DOCUMENTS 5,999,548 12/1999 Mori et al. ................................. 372/6

OTHER PUBLICATIONS

Hansen et al, OFC '98 Tech. Digest, vol. 2, pp. 31–33, Feb. 27, 1998.

Masuda et al, Electronics Letters, vol. 34, #13, 2 pp., Jun. 25, 1998.

Masuda et al, Electronics Letters, vol. 33, #9, pp. 753–754, Apr. 24, 1997.

Sun et al, Bell Labs Tech. Journ., vol. 4, #1, pp. 187–206, Mar. 1999.

Compensation of Raman Scattering and EDFA's Nonuniform Gain in Ultra–Long Distance WDM links—Jan. 1996.

*Primary Examiner*—Nelson Moskowitz
*Attorney, Agent, or Firm*—Frederick B. Luludis

[57] ABSTRACT

An optical amplifier is adapted to cancel the Raman gain of an optical transmission path that degrades those optical signals occupying the low end of the bandwidth such that the power is transferred from the latter signals to the optical signals occupying the high end of the bandwidth. More specifically, the optical amplifier adjusts the gain that it applies to the optical signals so that it favors the signal components at the low end of the bandwidth.

21 Claims, 7 Drawing Sheets

| CONTROLLER MEMORY | |
|---|---|
| PRE-TILT-0 | PRE-TILT-1 |
| PRE-TILT-2 | PRE-TILT-3 |
| PRE-TILT-4 | PRE-TILT-4 |
| ⋮ | ⋮ |
| PRE-TILT-N-1 | PRE-TILT-N |

OPTICAL AMPLIFIER ARRANGED TO OFFSET RAMAN GAIN

FIELD OF THE INVENTION

The invention relates to optical transmission systems and more particularly relates to an optical transmission amplifier.

BACKGROUND OF THE INVENTION

An optical transmission system has to contend with a number of different optical fiber nonlinearities, one of which is commonly referred to as Raman gain. The Raman gain is defined (in dB) as the difference between the power (in dB) of the longest wavelength channel and the power (in dB) of the shortest wavelength channel. The Raman gain, or effect, becomes particularly troublesome when an appreciable level of optical power distributed over a certain range of wavelengths is pumped into an optical fiber. In that instance, the Raman gain is tilted in favor of the channels having the longer wavelengths. As shown graphically in FIG. 1, the Raman effect attenuates the power levels of the optical channels of the lower wavelengths, but increases the power levels of the optical channels of the higher wavelengths by shifting the power from the former channels to the latter channels, as is illustrated in FIG. 1. The Raman gain thus degrades the Signal-to-Noise Ratio (SNR) of the signals in the lower wavelength channels and thus seriously degrades their performance. Experiments indicate that the Raman gain over a wavelength range of 32 nm could be >2.0 dB at 22 dBm total power launched into the transmission fiber for standard single mode fiber over an optical fiber span of 80 kilometers.

The Raman gain/tilt may produce some optical impairments in low power optical systems that have a narrow occupied signal bandwidth, since the total power launched into the fiber would also be low. However, that is not the case for a high power optical system having a relatively wide occupied signal bandwidth. The reason for this is that an optical signal/channel is typically transmitted over an optical fiber at a power level of, for example, >0 dBm to ensure that the optical signal will have a favorable SNR when it arrives at a downstream receiver. Since the power level of each of the optical channels is cumulative, then, in an 80 channel system, the level of the total power launched into the optical fiber at the output of an optical amplifier could be more than 20 dBm.

SUMMARY OF THE INVENTION

We have recognized that the best approach to dealing with the deleterious effect of Raman gain/tilt is to precondition optical signals prior to transmitting the signals over an optical fiber span. In one illustrative embodiment of the invention we compensate for the effect of the Raman tilt by generating a gain that is pretilted opposite to the Raman tilt, and applying the tilted gain to the spectrum of optical signals that are to be transmitted over an optical fiber.

In accordance with an aspect of the invention, such preconditioning is generated dynamically as a function of the number of channels contained in a received composite optical signal and the level of power in each such channel.

In another illustrative embodiment of the invention, the Raman tilt/gain is filtered out of the received optical signals before the signals are retransmitted over a next optical fiber span at the output of an optical amplifier.

These and other features of our invention will be readily appreciated from the following detailed description and accompanying drawings.

DETAILED DESCRIPTION

Figure 1:
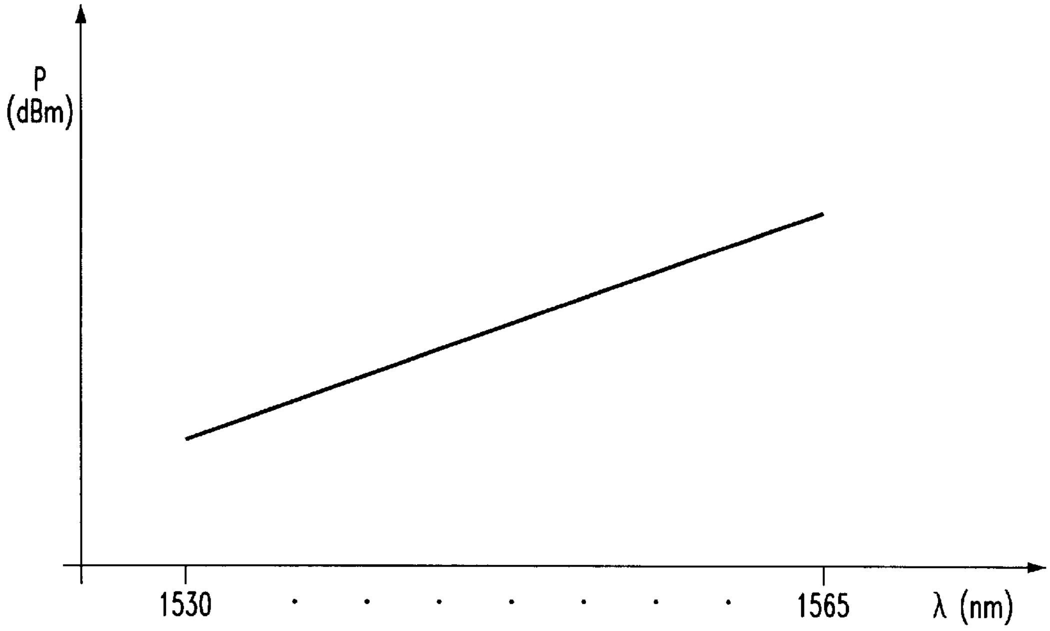
FIG. 1 is an illustrative example of the Raman effect.
Figure 2:
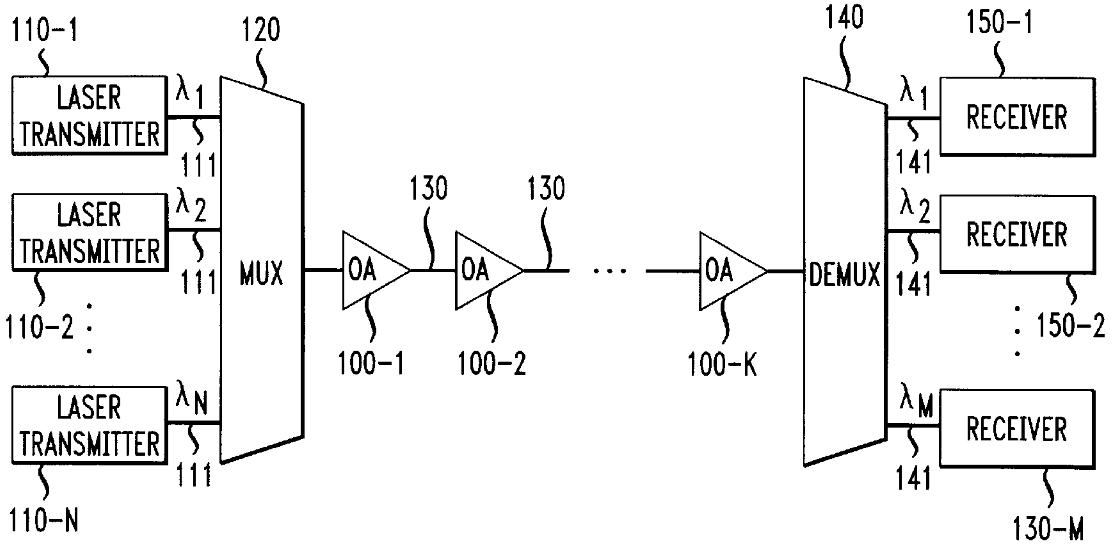
FIG. 2 is a broad block diagram of an optical transmission system in which the principles of the invention may be practiced.

An illustrative optical transmission system embodying the principles of the invention is shown in simplified form in FIG. 2. The optical system, more particularly, includes a plurality of laser transmitters 110-1 through 110-N, multiplexer 120, a plurality of optical amplifiers disposed along optical transmission path 130, demultiplexer 140 and optical receivers 150-1 through 150-M. Each of the transmitters outputs a respective information bearing optical signal having a unique wavelength, $\lambda_i$. It is assumed herein that a particular optical signal is destined for one of the receivers 150-1 through 150-M. For the present discussion, it is assumed that the optical transmission system has N optical channels, where N>1 and may be, for example, 80. The optical channels are respectively associated with transmitters 110-1 through 110-N. The N channels are identified by their respective wavelengths, $\lambda_1, \lambda_2, \lambda_3, \ldots \lambda_N$, which are sufficiently separated from one another to prevent signals in adjacent channels from interfering with one another. Such separation may be, for example, 200 GHz or less. The signals that transmitters 110-1 through 110-N output are combined (multiplexed) at MUX 120 and then outputted to optical transmission line 130 via optical amplifier 100-1. The combined optical signal is then transported via amplifiers 100-2 through 100-k-1 and optical cables 130 to DEMUX 140 via optical amplifier 100-k. DEMUX 140 separates the combined signals from one another and supplies the separated signals to respective ones of the receivers 150-1 through 150-M, where M equals N.

Figure 3A:
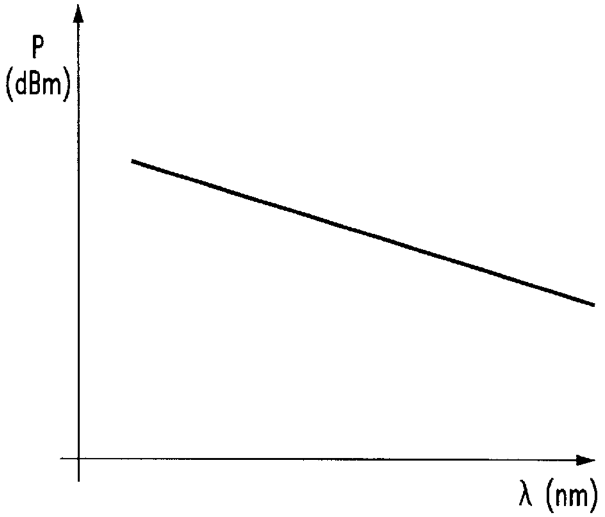
FIG. 3A is a graphical representation of the distribution of the power levels of optical signals as they are transmitted at the output of an optical amplifier 100-i of FIG. 2, in which the gain has been tilted in favor of the optical signals at the low end of the spectrum.
Figure 3B:
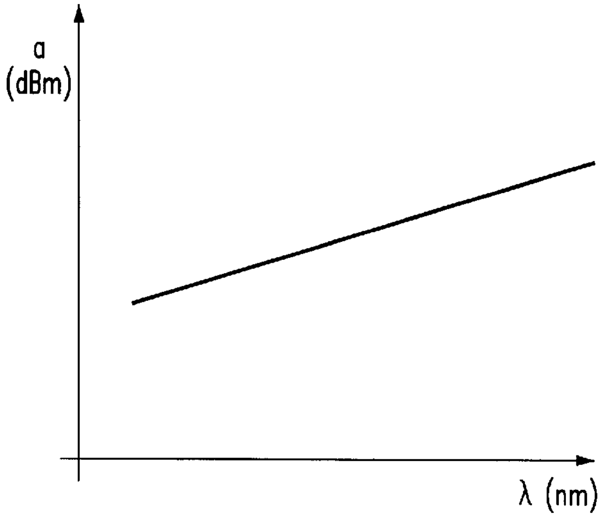
FIG. 3B is an illustrative example of the degree of tilt due to the Raman effect that the transmitted signals will experience as they are transported over the optical transmission path between optical amplifiers, e.g., amplifier 100-1 and 100-2 of FIG. 2.
Figure 3C:
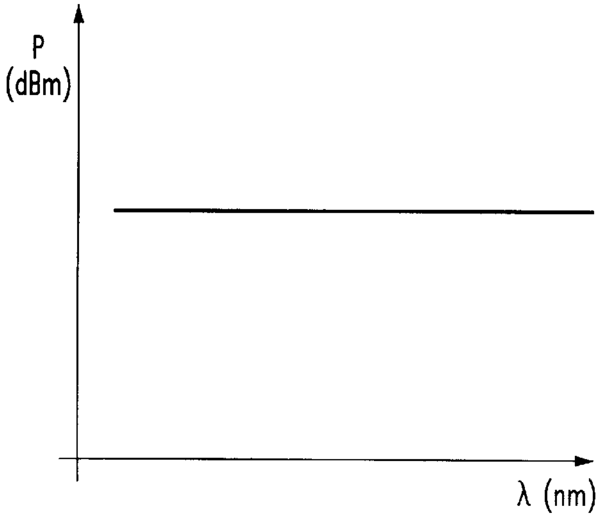
FIG. 3C illustrates graphically the way in which the gain of FIG. 3A cancel the Raman gain of FIG. 3B.

As mentioned above, the so-called Raman gain/tilt may be tolerated in optical transmission systems employing a relatively small number of channels, e.g., thirty-two or less. However, that is not the case for an optical transmission system employing a relatively large number of optical channels, e.g., 80 channels. In one illustrative embodiment of the invention we cancel out the effect of the Raman tilt by generating a gain that is pretilted opposite to the Raman tilt and applying the tilted gain to the spectrum of optical signals that are to be transmitted over an optical fiber, as is illustrated in FIGS. 3*a*, 3*b* and 3*c*. In particular, FIG. 3*a* is a graphical representation of the distribution of the power levels of optical signals as they are transmitted at the output of an optical amplifier 100-i, e.g., 100-1 (FIG. 2), in which the gain has been tilted in favor of the optical signals at the low end of the spectrum. FIG. 3*b* is an illustrative example of the degree of tilt due to the Raman effect that the transmitted signals will experience as they are transported over the optical transmission path between optical amplifiers 100-1 and 100-2. The pretilting of the optical signals, however, cancels out the power shift due to the Raman tilt such that the power levels of optical signals will be more or less flat at the end of the fiber transmission span, as is graphically illustrated in FIG. 3*c* for the ideal case.

The receiving optical amplifier, e.g., amplifier 100-2, in turn, processes the received optical signal to amplify the signals and to once again pretilt (pre-emphasize) the power levels of the optical signals opposite to that of the Raman tilt that occur in outgoing optical transmission path 130.

Figure 4:
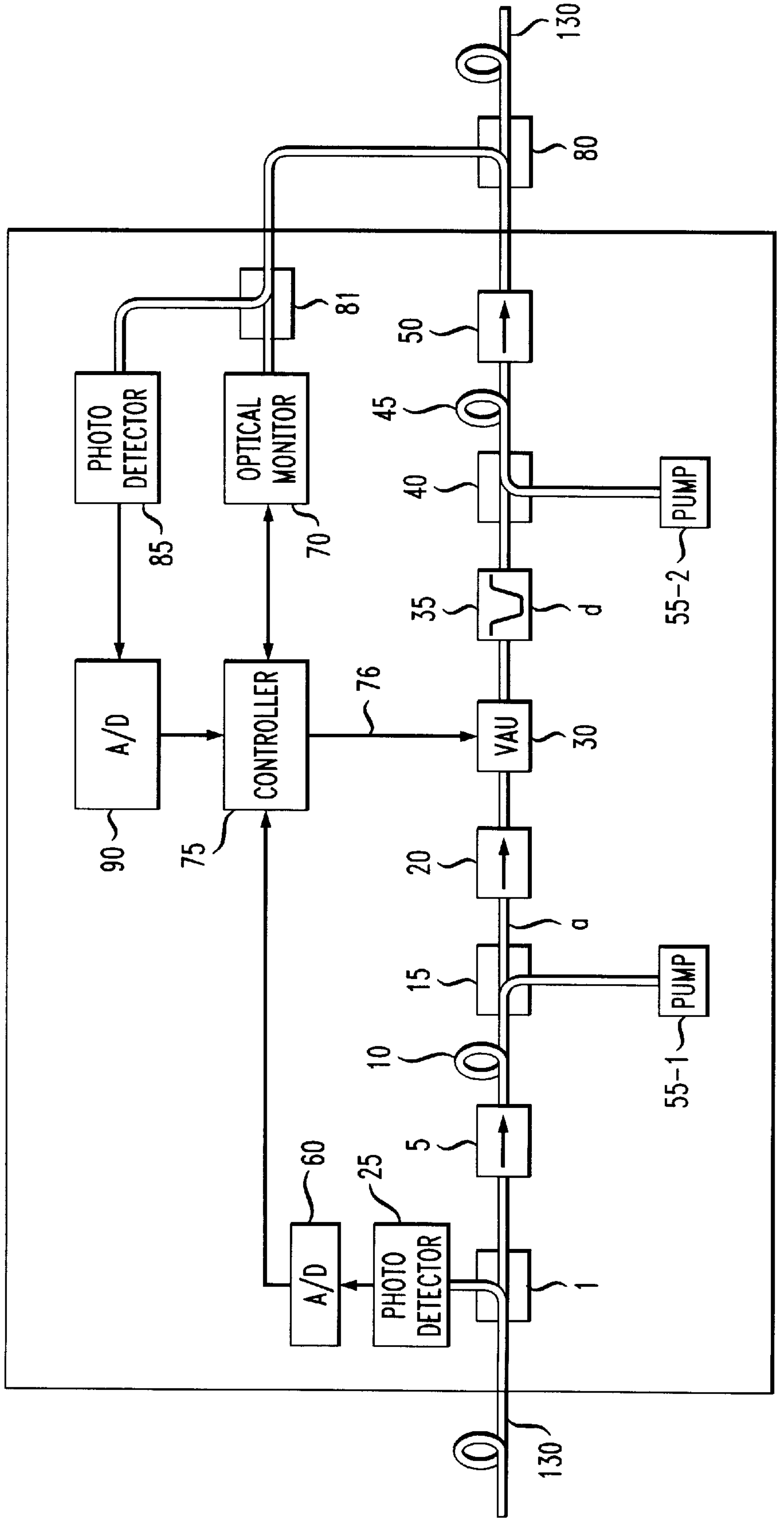
FIG. 4 is a broad block diagram of an amplifier 100 of FIG. 2.

A detailed block diagram of an optical amplifier 100-i is shown in FIG. 4. Amplifier 100-i, which represents each of the amplifiers 100-1 through 100-k in FIG. 2, receives an optical signal via optical transmission line 130, conventional signal coupler 1 and conventional optical isolator device 5. Isolator 5 allows the received signal to propagate toward rare-earth doped fiber 10 and prevents reflections and any spontaneous noise that may be generated along doped fiber 10 from flowing backward into the input fiber 130. Doped fiber 10, which may be, for example, an erbium doped fiber, provides optical gain when "pumped" by optical power supplied by pump laser 55-1 via conventional wavelength division multiplier (WDM) 15. The power provided by pump laser 55 excites the ions in doped fiber 10. The incoming signal photons collide with the excited ions, which causes the ions to release photons identical to the incoming photons. The released photons then combine with the incoming photons and propagate toward isolator 20 as an amplified signal. Isolator 20 prevents noise and/or reflected signals traveling toward WDM 15 from interfering with the amplifier function occurring at the input stage comprising isolator 5, doped fiber 10 and WDM 15.

The optical signal amplified by the first stage of amplifier 100-i is then supplied via conventional isolator 20 to Variable Attenuator Unit (VAU) 30, which controls the level of the optical signal that passes through attenuator 30 as a function of control signals that are received from controller 75 via bus 76.

In an illustrative embodiment of invention, variable attenuator 30 may be, for example, a rotating glass plate whose optical transmission may be varied incrementally from transparent to optically opaque. The level of the optical signal that passes through VAU 30 is thus a function of which sector of the glass plate is positioned within the transmission path through VAU 30, as will be explained below in detail.

The attenuated (adjusted) optical signal outputted by VAU 30 is then supplied to "gain flattening" filter 35 to provide a power level about which the response of the output stage of amplifier 100-i may be dynamically adapted. That is, the gain is tilted by changing changing the gain of erbium doped fiber 45, i.e., its inversion level. This is done by changing the level of the optical signal that passes through VAU 30. Note that the overall gain is fixed by the level of the input power and level of the saturated output power. Filter 35, more particularly, has a response that is the inverse of the gain spectrum of the input and output stages of amplifier 100-i to a signal level corresponding to the level of the aforementioned adjusted signal, in which the output stage comprises WDM 40, rare-earth doped fiber 45 (e.g., an erbium doped fiber) and isolator 50. WDM 40 combines the filtered signal with the pump power received via fiber 55-2 and supplies the combined signal to doped fiber 45, whereat optical amplification of the signal occurs in the manner discussed above. The amplified signal is then supplied to output optical fiber 130 via isolator 50 and conventional signal splitter 80, which diverts (supplies) a small portion of the outputted optical signal to optical monitor 70 via splitter 81. In an illustrative embodiment of the invention, monitor 70 may be, for example, an optical spectrum analyzer, preferably the optical spectrum analyzer known by the Comcode 200899540 available from Lucent Technologies Inc.

Figure 5:
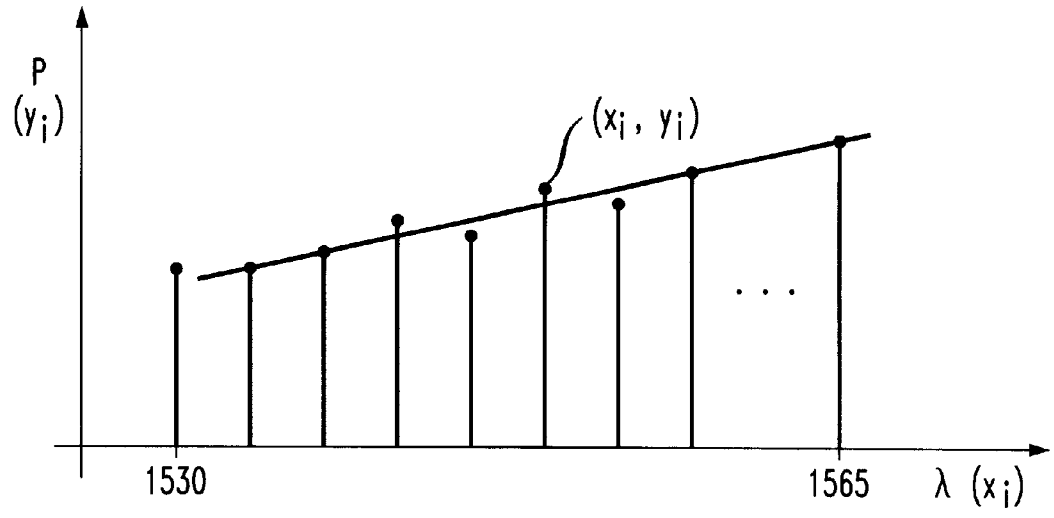
FIG. 5 is an illustrative example of the way in which optical monitor 70 of FIG. 4 measures the level of power of each wavelength that it detects in a signal outputted by the amplifier of FIG. 4.
Figure 6:
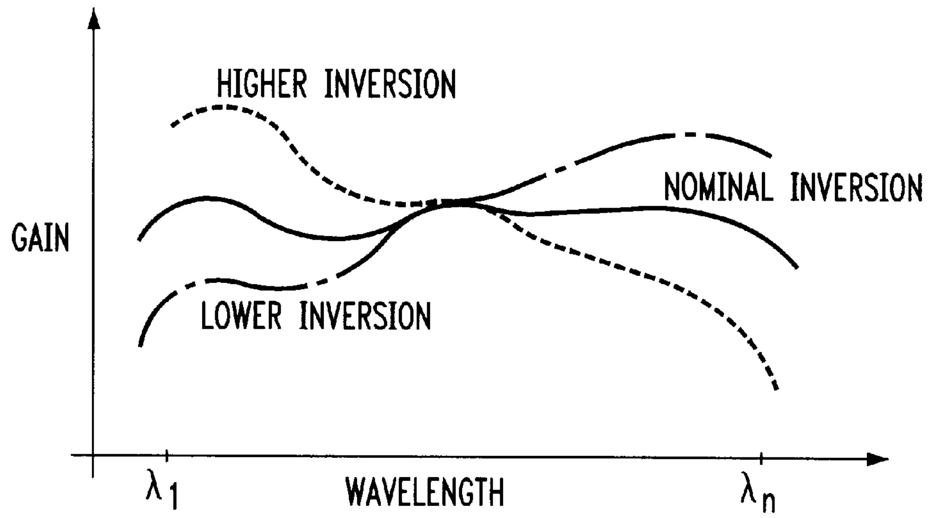
FIG. 6 illustrates the different saturation states for the output amplification stage of the optical amplifier of FIG. 4.

Optical monitor (spectrum analyzer) 70, more particularly, analyzes the spectrum of the optical signal that it receives via splitter 81 and determines the wavelengths and power levels of the component optical signals forming the outputted optical signal. Optical monitor 70 then supplies the results of its determination to controller 75. An example of such canalization is illustrated in FIG. 5, in which monitor 70 measures the level of power of each wavelength that it detects and supplies the data ($x_i$, $y_i$) to controller 75. In an illustrative embodiment of the invention, controller 75 may be a conventional microcomputer programmed in conventional manner to dynamically adjust variable attenuator 30 to increase or decrease its level of attenuation, in accordance with the data that it receives from monitor 70, the amount of light that is supplied to erbium doped fiber 45. Controller 75 continues to adjust attenuator 30 until the desired pre-emphasis of the outputted optical signal is achieved. As is well-known, the response of fiber 45 may be changed dynamically between different levels of inversion by increasing or decreasing the amount of light that is supplied to fiber 45, as is illustrated in FIG. 6.

It is seen from FIG. 4 that splitter 81 divides the signal that it receives between optical monitor 70 and photodetector 85. Photodetector 85, more particularly, converts the optical signal to an electrical signal and supplies the latter signal to analog/digital (A/D) converter 90. A/D converter 90 converts the level of the electrical signal that it receives to a digital value and supplies the digital value to controller 75. The digital signal supplied to controller 75 is indicative of the level of power, designated Po, of the signal that is outputted to path 130. Similarly, photodetector 25 and A/D converter 60 supply a digital value indicative of the level of power of the received signal, designated Pi, to controller 75. As will be explained below, controller 70 uses the digital values, Pi and Po, in its determination of the desired tilt for the outgoing signal.

Figure 7:
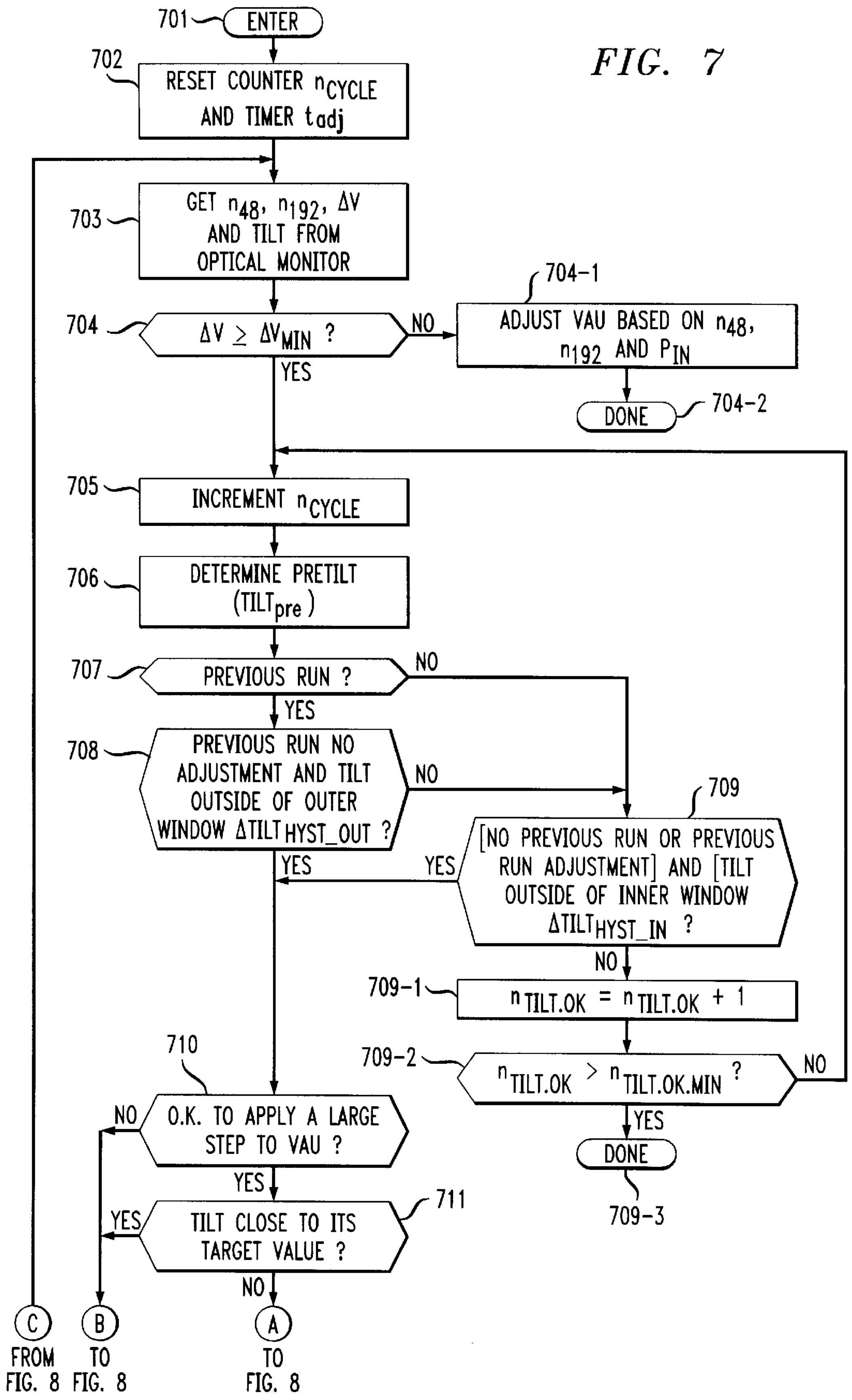
FIGS. 7 and 8 shows in flow chart form an illustrative program which implements the principles of the invention in the controller of FIG. 4.
Figure 8:
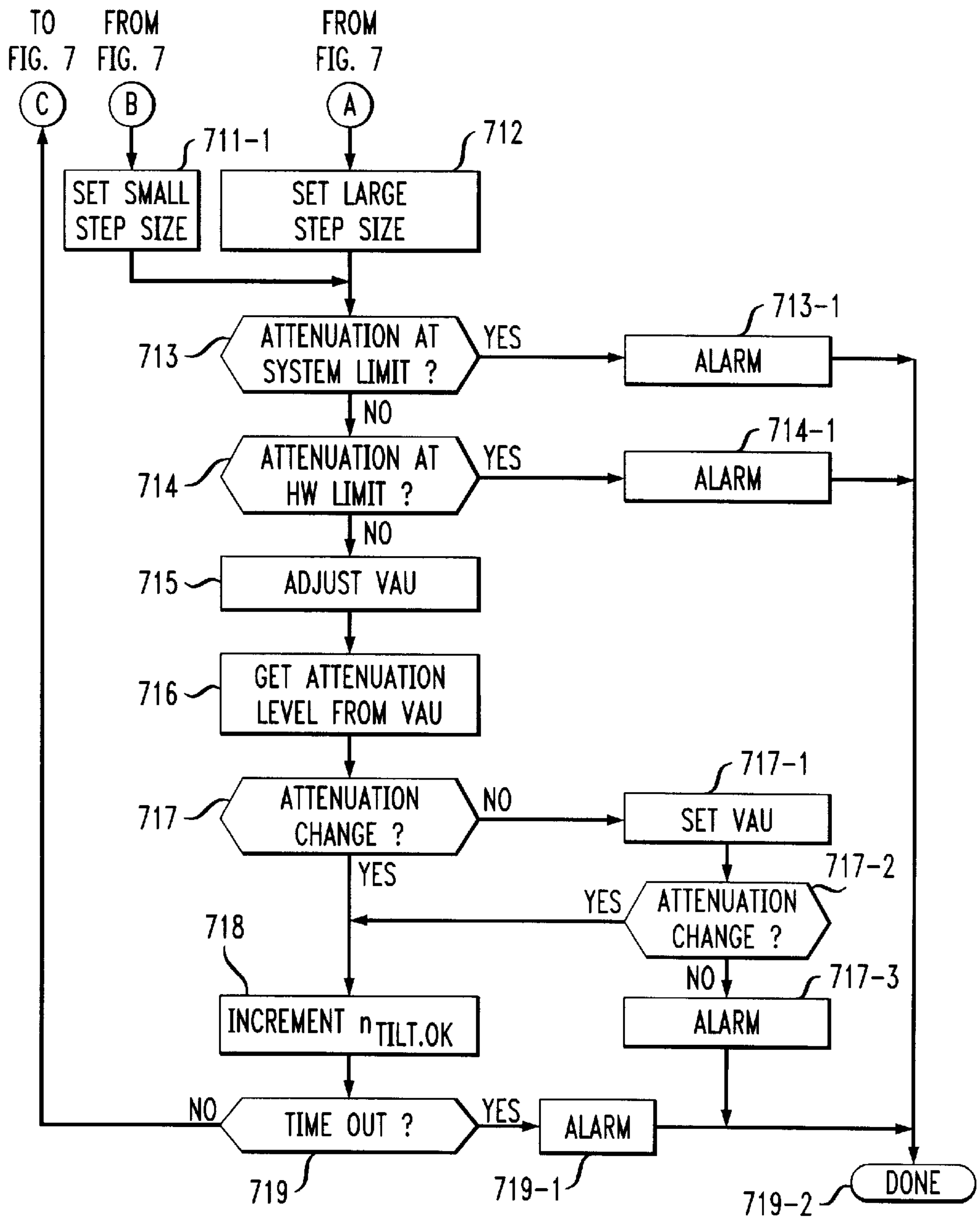
Figure 9:
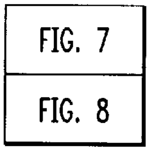
FIG. 9 shows the way in which FIGS. 7 and 8 should be arranged with respect to one another.

The program which implements the principles of the invention in controller 75 is shown in flowchart form in FIGS. 7 and 8, which should be arranged as shown in FIG. 9. In particular, the program is entered at block 701 in response to one of a number of different "trigger" events.

These events include, inter alia, (a) a system upgrade, such as increasing the number of channels (wavelengths), for example, from 40 to 60; (b) a change in the input power detected by OA 100; (c) periodically, e.g. every ten minutes; or (d) if the OA is a downstream OA, and it receives a message indicating that an upstream OA is running its controller 75 program; etc. When so entered, the program proceeds to block 702 where it initializes a counter $n_{cycle}$ and a timer $t_{adj}$. The program (block 703) then obtains data from optical monitor 70. In accordance with an illustrative embodiment of the invention, this data includes the number of OC48 channels, $n_{48}$, and number of OC192 channels, $n_{192}$, contained in the output signal and the bandwidth ($\Delta\mu$) of the output signal. The data also includes the TILT of the output signal.

When the program receives the requested data it then compares (block 704) the value of the bandwidth, $\Delta\mu$, of the output signal with a minimum value, $\Delta\mu_{min}$ e.g., a value indicative of a signal formed from fifteen adjacent channels. If the value of $\Delta\mu$ is less than the minimum, then the program (block 704-1) sets (rotates) the variable attenuator unit (VAU) 30 to a nominal value determined as a function of the values of $n_{48}$ and $n_{192}$ and as a function of the power level of the incoming optical signal. The program then exits via block 704-2. If the value of $\Delta\mu$ is found to be greater than $\Delta\mu_{min}$, then the program (block 705) increments counter $n_{cycle}$ and then determines (block 706) a pretilt value as a function of the level of the output power, Po, and width of the signal band, $\Delta\mu$, and type of fiber connected to the output of the associated optical amplifier 100.

In an illustrative embodiment of the invention, the program uses the value of the power that is launched into the output fiber to indirectly index a table of Pretilt values, and read out a pretilt value appropriate for the launched power value. The program then determines the difference between the pretilt value read out of the table and the pretilt value obtained from the optical monitor. The program then adjusts the VAU as a function of that difference to obtain the desired pretilt of the output signal. Specifically, at block 707, the program proceeds to block 708 if it determines that a previous run successfully adjusted the VAU, setting such that the outputted signal was pretilted to within a window, e.g., ±½ dB, of a desired pretilt value. (Note that this window is referred to herein as the inner window.) Once the pretilt has been set to be within the inner window, then the program thereafter checks the setting to determine if it is still within a coarser window referred to herein as the outer window.

If a previous run was not made or not completed, then the program (block 709) checks to see if the desired pretilt value is within the inner window. If so, then the program proceeds to block 709-1 to increment a counter $n_{tilt,ok}$. It then checks (block 709-2) to see if the value of the incremented counter exceeds a predetermined value, $n_{tilt,ok,min}$. If it does, then the program exits via block 709-3. Otherwise, the program returns to block 705. If the pretilt of the output signal is not within inner window of the desired pretilt determined at block 706, then the program proceeds to block 710. Similarly, if the pretilt of the output signal at block 708 is found not to be within the outer window of the desired pretilt determined at block 706, then the program also proceeds to block 710. The program (block 710) then checks to see if it can move the VAU setting by a large step—illustratively at least five nominal steps. The program may do so if it is the first OA of a string of OAs, or if it is a downstream OA in the string and the first OA is not currently adjusting its VAU. If the determination at block 710 indicates that a large step may be used to adjust the VAU, then the program proceeds to block 711, where it checks to see if the tilt of the output signal is close to the target value (i.e., the value read out of the aforementioned table). If so, then the program (block 711-1) sets a step size indicator to equal a small step size and then proceeds to block 713. If not, then the program (block 712) sets the indicator to equal a large step size.

If the program finds that the level of attenuation has reached a system limit (block 713) or has reached a hardware (HW) limit (block 714), then the program outputs an appropriate alarm (block 713-1 or 714-1, respectively) and exits via block 719-2 to await a next entry via block 701. Otherwise, the program (block 715) adjusts the level of the VAU attenuation by sending a number of signal pulses to the VAU corresponding to a large or small step, as the case may be. Each such signal pulse causes the VAU to increase (or decrease) the level of attenuation in accordance with a predetermined step size, e.g., 0.1 dB. The program (block 716) then obtains a voltage level from the VAU, in which voltage level is indicative of the current level of attenuation inserted by the VAU. The program (block 717) then compares the current level of attenuation with the previous level of attenuation to determine if the VAU responded to the signal pulses. If not, then the program (block 717-1) again sends the signal pulses to the VAU and again (block 717-2) determines if the level of attenuation changed. If not, then the program (717-3) outputs an alarm and proceeds to block 719-2. If so, then the program (block 718) increments counter $n_{tilt,ok}$, and then (block 719) checks to determine if either the amount of time/number of attempts allotted to adjust the VAU to achieve the desired pretilt has expired. The program does this by comparing timer $t_{adj}$ and the content of counter $n_{cycle}$ with respective maximum values. If either the allotted time or number of cycles has expired then the program (719-1) outputs an alarm and proceeds to block 719-2. Otherwise, the program returns to block 703.

Figure 10:
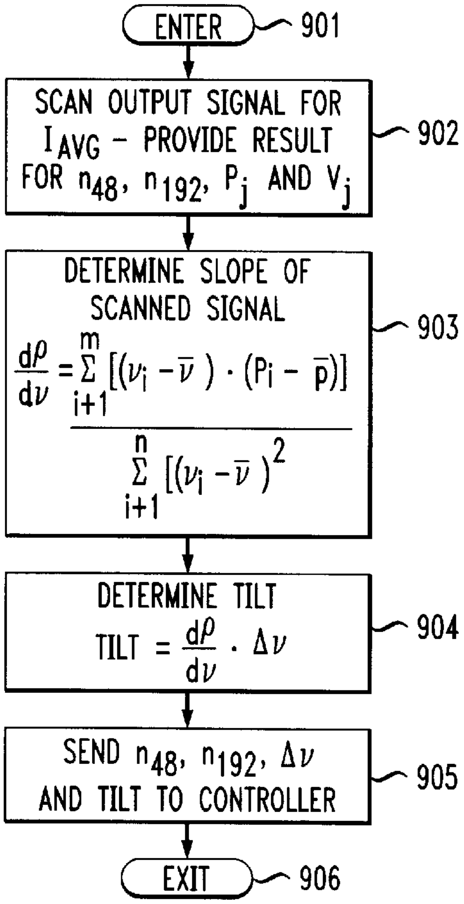
FIG. 10 shows in flow chart form an illustrative program which implements the principles of the invention in the optical monitor of FIG. 4.

An illustrative program which implements the principles of the invention in Optical Monitor 70 is shown in FIG. 10. Specifically, when entered at block 901, the program (block 902) scans the optical signal that it receives via tap 80 (FIG. 4). The optical monitor, in a conventional manner, then determines the number of OC48 channels, $n_{48}$, and number of OC192 channels, $n_{192}$, contained in the scanned signal. The optical monitor also determines the bandwidth, $\mu$, of the scanned signal as well the powers of channels, Pj. The program then averages the values of these results over a successive number of scans, e.g., five scans. The program (block 903) then determines the slope, dP/dv, of the scanned signal and determines (block 904) the level of tilt that the output signal is exhibiting, as shown. The program then supplies the scanned result and the determined tilt value to controller 75. The program then exits 906 for re-entry at block 901.

Figure 11:
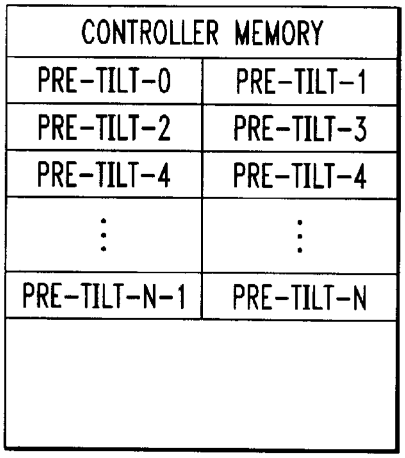
FIG. 11 is an illustrative layout of memory for storing a table of tilt values.

FIG. 11 shows one illustrative example of the way in which the controller memory may be arranged to accommodate a table of pre-tilt values that the controller program accesses at block 706, FIG. 7.

It will thus be appreciated that, although the invention illustrated herein is described in the context of a specific illustrative embodiment, those skilled in the art will be able to devise numerous alternative arrangements which, although, not explicitly shown or described herein, nevertheless, embody the principles of invention and are within its spirit and scope. For example, an appropriate filter may be added to an optical amplifier to filter the Raman gain out of received optical signals before the signals are retransmitted over a next optical fiber span at the output of the optical amplifier. As another example, the VAU 30 may be adjusted manually.

We claim:

1. An optical amplifier comprising apparatus that receives an optical signal at an input of the optical amplifier, in which the signal is formed from a plurality of optical signals of respective wavelengths, and apparatus that amplifies the received optical signal such that the amplified signal is pre-emphasized to offset Raman gain, and then supplies the amplified signal to an output connected to an optical transmission link whereat the Raman gain occurs.

2. The optical amplifier of claim 1 wherein the optical amplifier includes an output amplifier stage that is operated in different levels of inversion to provide said pre-emphasis.

3. The optical amplifier of claim 2 wherein the optical amplifier further includes a variable attenuator that is adjusted dynamically to place the output amplifier stage in a particular one of the different levels of inversion.

4. The optical amplifier of claim 2 wherein the output amplifier stage is an erbium doped amplifier.

5. The optical amplifier of claim 3 wherein the optical amplifier further comprises an optical monitor that samples a portion of the signal power that is supplied to the optical transmission link and determines, inter alia, the slope of the output signal, level of pre-emphasis, and bandwidth and level of power of the outputted signal, and a controller that receives such determinations from the optical monitor and (a) generates a desired level of pre-emphasis as a function of at least the power level of the signal supplied to the optical transmission path, (b) adjusts the variable attenuator as a function of the difference between the desired level of pre-emphasis and level of pre-emphasis determined by the optical monitor.

6. The optical amplifier of claim 5 wherein the optical monitor is an optical spectrum analyzer.

7. The optical amplifier of claim 3 wherein the variable attenuator is an optical attenuator that is controlled electrically.

8. The optical amplifier of claim 3 wherein the variable attenuator is an optical attenuator that is controlled manually.

9. An optical amplifier comprising an input stage that receives an optical signal having a bandwidth formed from a plurality of component optical signals of respective wavelengths, and an output stage that amplifies the component optical signals in accordance with a predetermined slope value such that the power levels of the signal components having the lower wavelengths are greater than the power levels of the signal components having the higher wavelengths.

10. The optical amplifier of claim 9 wherein the output stage is operated in a particular level of inversion to provide the predetermined slope value.

11. The optical amplifier of claim 9 wherein the optical amplifier further comprises a variable attenuator that is adjusted dynamically to place the output stage in the particular level of inversion.

12. The optical amplifier of claim 9 wherein the output amplifier stage is an erbium doped amplifier.

13. The optical amplifier of claim 11 wherein the optical amplifier further comprises an optical monitor that samples a portion of the signal that is supplied to the optical transmission link and determines, inter alia, the (a) slope of the output signal, (b) bandwidth of the output signal and (c) level of power of the outputted signal, and a controller that receives such determinations from the optical monitor and (a) generates a desired slope as a function of at least the power level of the signal supplied to the optical transmission path, (b) adjusts the variable attenuator as a function of the difference between the desired level of slope and level of slope determined by the optical monitor.

14. The optical amplifier of claim 13 wherein the optical monitor is an optical spectrum analyzer.

15. The optical amplifier of claim 11 wherein the variable attenuator is an optical attenuator that is controlled electrically.

16. The optical amplifier of claim 11 wherein the variable attenuator is an optical attenuator that is controlled manually.

17. An optical amplifier comprising an input stage that receives an optical signal having a bandwidth formed from a plurality of component optical signals of respective wavelengths, and an output stage that amplifies the component optical signals linearly in accordance with a predetermined slope value that is tilted such that the power levels of the signal components having the lower wavelengths are greater than the power levels of the signal components having the higher wavelengths.

18. An optical amplifier comprising apparatus that receives an optical signal formed by a plurality of component signals of respective wavelengths from an optical transmission line that changes the power levels of the components signals in accordance with a particular Raman gain value, and apparatus that generates a gain value that is tilted opposite to the Raman gain, applies the tilted gain to the component signals and then transmits the resulting optical signal over an optical path connected to an output of the optical amplifier.

19. An optical amplifier comprising apparatus that receives an optical signal formed by a plurality of component signals of respective wavelengths from an optical transmission line that changes the power levels of the components signals in accordance with a particular Raman gain value, and apparatus that filters the Raman gain out of the component signals before the component signals are retransmitted over a next optical fiber span connected to an output of the optical amplifier.

20. An optical amplifier comprising apparatus that receives an optical signal formed by a plurality of component signals of respective wavelengths from an optical transmission line that changes the power levels of the components signals in accordance with a particular Raman gain value, and apparatus that derives a gain value that is tilted opposite to and within a first window of power levels of the Raman gain, applies the tilted gain to the component signals and then transmits the resulting optical signal over an optical path connected to an output of the optical amplifier.

21. The optical amplifier of claim 20 wherein the apparatus that derives the gain value includes apparatus that thereafter rechecks the gain value to ensure that it is tilted opposite to and within a second window of power levels of the Raman gain.

* * * * *